(12) United States Patent
Jain

(10) Patent No.: US 8,259,736 B2
(45) Date of Patent: Sep. 4, 2012

(54) SELECTING A PATH THROUGH A NETWORK

(75) Inventor: Manoj Kumar Jain, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 339 days.

(21) Appl. No.: 12/638,794

(22) Filed: Dec. 15, 2009

(65) Prior Publication Data
US 2011/0142056 A1  Jun. 16, 2011

(51) Int. Cl.
*H04L 12/28* (2006.01)
*H04L 12/56* (2006.01)
(52) U.S. Cl. ........................................................ 370/400
(58) Field of Classification Search .................. None
See application file for complete search history.

(56) References Cited

OTHER PUBLICATIONS

Ismail et al. Traffic Engineering: Simulation Model and Real Network Environment Over Single and Multiple Links, ISSN 1450-216X vol. 25 No. 1, 2009 pp. 54-67.
Fortz et al. Traffic Engineering With Traditional IP Routing Protocols, IEEE Communications Magazine, Oct. 2002, vol. 40, No. 10, pp. 110-131.

*Primary Examiner* — Ayaz Sheikh
*Assistant Examiner* — Blanche Wong

(57) ABSTRACT

In a method for selecting a path through a network of nodes from a source device to a destination device, per hop behaviors (PHB) of the nodes is identified and a path entropy for a plurality of candidate paths through the network between the source device and the destination device are derived based upon the PHBs of the nodes. In addition, one of the plurality of candidate paths is selected to communicate data from the source device to the destination device based on the path entropies of the plurality of candidate paths.

20 Claims, 5 Drawing Sheets

SELECTING A PATH THROUGH A NETWORK

BACKGROUND

Traffic engineering, which is also known as tele-traffic engineering and traffic management, of a telecommunications network is often used to achieve performance objectives, such as optimization of network resources. Routing capacity and placement of traffic on particular links are examples of network resources for which optimization is often sought. Traffic engineering over Multiprotocol Label Switching (MPLS) enables connection-oriented paths, which provides granular control over packet flow for end-to-end quality assurance. This generally means that a path computed from a source to a destination is subject to a set of constraints, and traffic is forwarded along this computed path. MPLS traffic engineering is a growing implementation in today's service provider networks.

Traffic engineering extensions to Interior Gateway Protocols (IGPs), such as Open Shortest Path First (OSPF) and Intermediate System-Intermediate System (IS-IS) distribute extended link attributes. Resource reservation protocol-traffic engineering (RSVP-TE) provides connection oriented predicted service over a packet network. The Traffic engineering capabilities offered by these protocols may be deemed adequate for Traffic Engineering. However, for a complex network configuration, an administrator specifies explicit routes or paths to forward traffic along these paths. Over a period of time, the routes specified by the administrator may lead to inadequate or unbalanced resource utilization.

On the other hand, constraint-based routing is designed to automatically compute paths subject to a set of constraints. Constraint-based routing assists in performance optimization of operational networks by automatically finding feasible paths that satisfy a set of constraints for traffic trunks. However, constraint-based routing does not provide administrative control to set up explicit paths. As such, in case of a network outage, re-computation of an optimized path is typically unavoidable, inefficient, and causes a performance penalty.

BRIEF DESCRIPTION OF THE DRAWINGS

Features of the present invention will become apparent to those skilled in the art from the following description with reference to the figures, in which.

DETAILED DESCRIPTION

Figure 1:
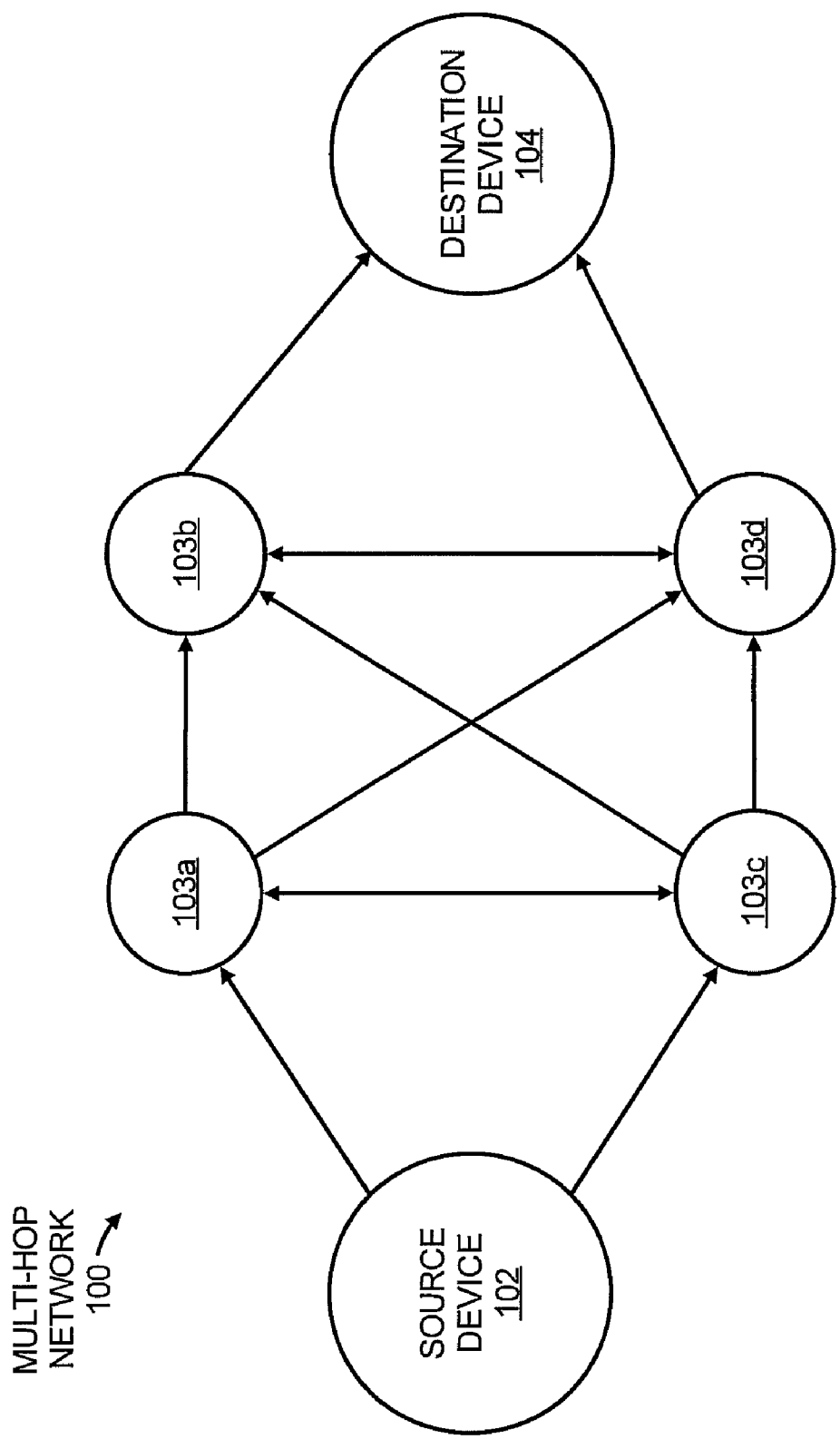
FIG. 1 shows a simplified block diagram of a multi-hop network, according to an embodiment of the present invention.

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

Disclosed herein are a method and optimizer for selecting a path for data flow through a network of nodes from a source device to a destination device. More particularly, the system and method disclosed herein are configured to select a path among a plurality of candidate paths for transmitting the data flow from the source device to the destination device. In addition, the selection of the path may be based upon the class of service/application to be provided in communicating the data from the source device to the destination device. As discussed in greater detail herein below, a mathematical model that describes the behavior of the nodes in terms of resources/routing capacity is developed and implemented in selecting the path. In addition, the current path is analyzed to determine whether it is optimal based upon a set of weighted constraints. Moreover, the flow demands of the current path and/or the optimized path are adapted and recomputed when new constraints are applicable.

Through implementation of the method and optimizer disclosed herein, data flow paths through a network of nodes may automatically be identified as conditions change in the network. As such, the method and optimizer disclosed herein enable for preferred class-based data flow paths to be identified in a relatively quick and efficient manner. In addition, the optimization of explicit paths is flexible and provides administrative control.

As discussed herein, a data flow includes communication of information over a network, which may be for one application or service. Examples of types of data flows are Voice over Internet Protocol (VoIP), multiplayer game data, streaming video or audio, or bulk transfer of data. The source and destination devices are configured to send or receive data flows via a path and data flows may pass through the path to the destination device or another network.

A path may be a multi-hop route from a source device to a destination device in a multi-hop network. In a multi-hop network, a signal moves or "hops" between multiple nodes before reaching a destination device. When the nodes in a multi-hop network are all connected to each other, the multi-hop network is considered to be a fully connected network. A node is a network device, such as a router, hub, switch, a laptop, a mobile phone, a personal digital assistant (PDA), etc. In addition, the source device and the destination may also be considered as nodes.

The methods described herein are not limited to be applied only to a multi-hop network. The methods may also be applied to other wired or wireless networks, such as wired or wireless telecommunications networks, Worldwide Inter-operability for Microwave Access (WiMax) networks, or other types of networks.

FIG. 1 illustrates a simplified block diagram of a multi-hop network 100, according to an example. It should be clearly understood that the multi-hop network 100 may include additional components and that some of the components described herein may be removed and/or modified without departing from a scope of the multi-hop network. As such, the multi-hop network 100 may include any number of nodes, source devices, and network devices. In addition, the multi-hop network 100 may be connected to an access network or any wide area network (WAN) or other network.

The multi-hop network 100 includes a source device 102, multiple nodes 103a-103d, and a destination device 104. The source device 102 and the destination device 104 may also comprise nodes in the multi-hop network 100, as they may be intermediate nodes for forwarding data flows to other source devices or destination devices in or outside of the network 100.

The source device 102 may receive data from another network device or may originate a data flow, such as a VoIP call, to be communicated to the destination device 104. The source device 102 may send the data to the destination device 104 via different combinations of nodes 103a-103d, as graphically depicted by the arrows in FIG. 1. Each of the different combinations of nodes 103a-130d is associated with a different behavioral characteristic as discussed below. In any regard, the nodes 103a-103d may be equipped with interfacing components/software to interface with the source device 102, the destination device 104, other nodes located within and/or outside of the multi-hop network 100. The destination device 104 may include an end user device, such as a laptop, cellular telephone, etc.

According to an embodiment, the source device 102 is configured to send different types of data to the destination device 104 via different combinations of nodes 103a-103d or paths. For example, a first type of data flow may be communicated from the source device 102, to a first node 103a, and then to a second node 103b prior to reaching the destination device 104. In addition, a second type of data flow may be communicated from the source device, to the first node 103a, and then to a fourth node 103d prior to reaching the destination device 104. As discussed in greater detail herein below, the paths for different types of data flows (classes) may be selected to substantially optimize the communication of that type of data flow (class) between the source device 102 and the destination device 104.

Figure 2:
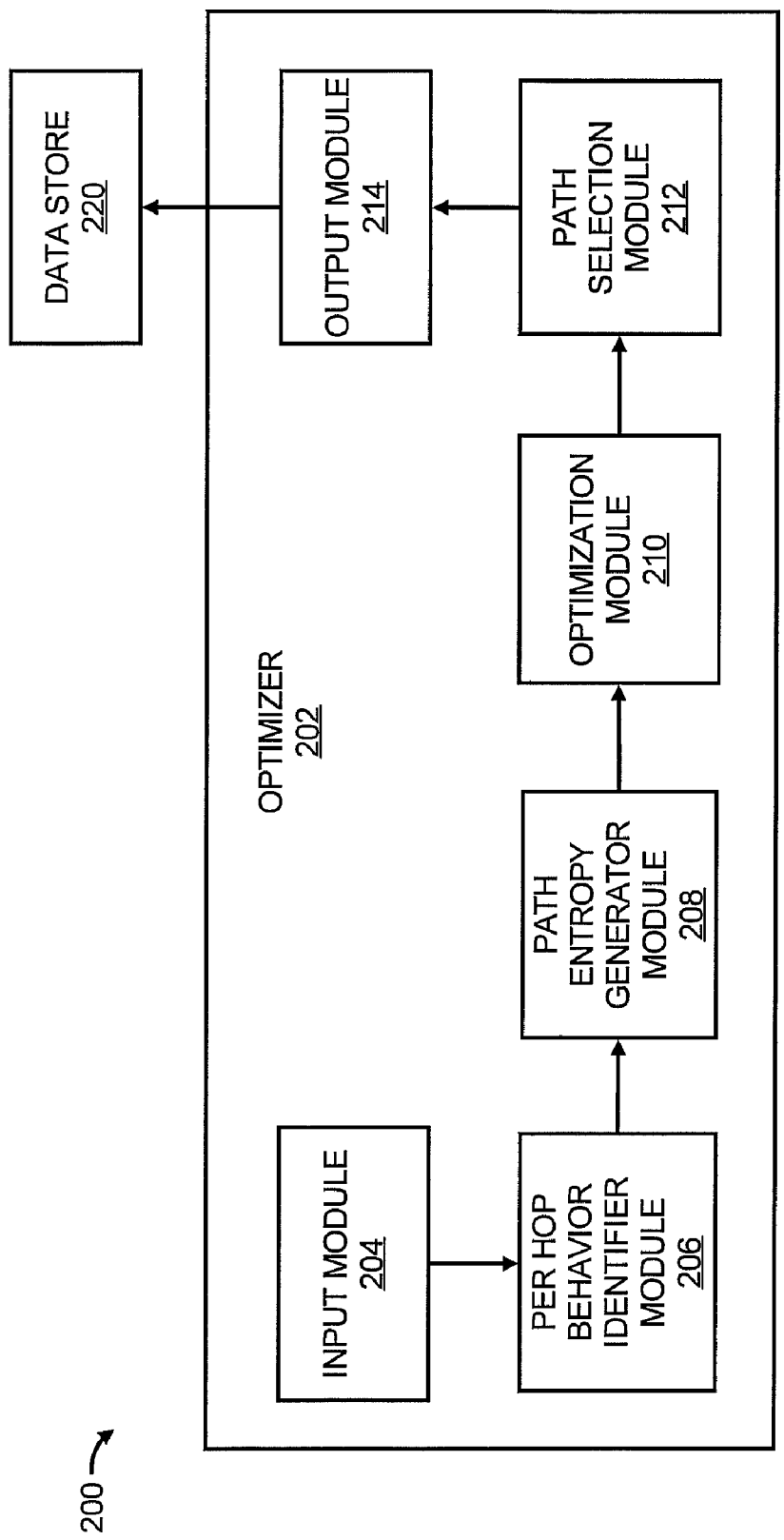
FIG. 2 shows a simplified schematic diagram of a system for selecting a path through a network of nodes from a source device to a destination device, according to an embodiment of the present invention.

With reference now to FIG. 2, there is shown a simplified schematic diagram of a system 200 for selecting a path through a network of nodes from a source device to a destination device, according to an example. It should be understood that the system 200 may include additional elements and that some of the elements described herein may be removed and/or modified without departing from the scope of the system 200. Thus, some of the functionalities of the modules discussed herein may be performed by a fewer or larger number of modules and may also be performed by a single module.

As shown, the system 200 includes an optimizer 202, which may comprise software, firmware, and/or hardware and is configured to select one or more paths through a network of nodes from a source device 102 to a destination device 104. The optimizer 202 is generally configured to identify per hop behaviors (PHBs) of the nodes, to derive a path entropy for each of a plurality of candidate paths based upon the PHBs of the nodes, and to select one of the plurality of candidate paths to communicate data from the source device 102 to the destination device 104 based on the entropies of the candidate paths.

Generally speaking, the PHBs of the nodes define the quantized behavior characteristics for a class of service/application. The PHBs of the nodes may be defined as:

$$PHB(ci) = B * Ci * Wi. \quad \text{Equation (1)}$$

Equation (1) represents per class quantized hop behavioral characteristic. In Equation (1), PHB (ci) is the PHB of the ith class, B is a maximum percent (%) reserved link bandwidth for the ith class, Ci is a cost of the path for the ith class to utilize the path, and Wi is an administrative controlled preferred weight for the ith class. The administrative controlled preferred weight is a predefined path preference for the ith class. In addition, a class is a class of service/application for differentiating a plurality of different data flows.

The path entropy for a candidate path is the cumulative sum of PHBs per class along the candidate path between a source device and a destination device. In addition, each of the plurality of candidate paths includes a maximum path entropy and a used path entropy. The maximum path entropy in a particular path is the highest path entropy attainable for that particular path. The used path entropy in a particular path is the currently used entropy for that particular path. Thus, the used path entropy cannot exceed the maximum path entropy for the same path. By way of example, the maximum path entropy may be defined as the maximum capacity of a virtual pipe for a class (path between the source device and the destination device) and the used path entropy is the data flow through the virtual pipe. The maximum path entropy and the used path entropy for a particular path and class may be defined as:

$$\text{Max Path } PE(ci) = \sum_{h=0 \to n} PHB(ci); \text{ and} \quad \text{Equation (2)}$$

$$\text{Used Path } PE(ci) = \sum_{h=0 \to n} phb(ci). \quad \text{Equation (3)}$$

In Equations (2) and (3), the ci represents a particular class and n represents the total number of hops along the path.

As shown in FIG. 2, the optimizer 202 is depicted as including an input module 204, a per hop behavior (PHB) identifier module 206, a path entropy generator module 208, an optimization module 210, a path selection module 212, and an output module 214. The modules 204-214 are designed to perform various functions in the optimizer 202.

In instances where the optimizer 202 comprises software, the optimizer 202 may be stored on a computer readable storage medium and may be executed or implemented by a computing device processor (not shown). In these instances, the modules 204-214 may comprise software modules or other programs or algorithms configured to perform the functions described herein below. In instances where the optimizer 202 comprises firmware and/or hardware, the optimizer 202 may comprise a circuit or other apparatus configured to perform the functions described herein below. In these instances, the modules 204-214 may comprise one or more of software modules and hardware modules configured to perform these functions.

The input module 204 may receive input from a network management software (NMS) or from a network node manager (NNM) (not shown). The input module 204, more particularly, is configured to receive data related to traffic trunk attributes, such as an ingress node (ex: source), an egress node (ex: destination), all the possible paths between the source and the destination, number of hops on a particular path, and classes to be supported by each node. Examples of classes are C0 through C7 classes as defined in the DiffServ or MPLS traffic engineering.

In other examples, the input module 204 is configured to receive data related to per hop attributes, such as a bandwidth, classes allowed in a particular hop, a maximum reserveable bandwidth per class, which may be a certain percentage of a total bandwidth, cost of the path for a class, etc. The data received through the input module 204 may be stored in a data store 220, which the optimizer 202 may access in performing various functions discussed below.

The data store 220 may comprise volatile and/or non-volatile memory, such as DRAM, EEPROM, MRAM, flash memory, and the like. In addition, or alternatively, the data store 220 may comprise a device configured to read from and write to a removable media, such as, a floppy disk, a CD-ROM, a DVD-ROM, or other optical or magnetic media.

The PHB identifier module 206 is configured to derive PHBs of the nodes for one or more different classes, for instance, based upon the information received through the input module 204 discussed above. Each of the one or more different classes is a class of service for differentiating a plurality of different data flows. The PHB identifier module 206 is configured to identify a total bandwidth of the path, cost of the path for one or more different classes to use the path, and a preferred weight for one or more different classes. An example of a cost of the path may include an economic cost or a monetary value associated with using the path. The preferred weight is a predefined path characteristic for each of the one or more different classes. For example, referring to FIG. 1, a first path may have the shortest delay, a second path may have the least loss rate, and a third path may have the highest bandwidth. The delay, loss rate, and bandwidth are path characteristics and the shortest delay, the least loss rate, and the highest bandwidth are predefined path characteristics for different classes. The preferred weight is a quantized multiplier that considers all path characteristics or some more attributes and may create a fixed weight factor for the path characteristics. For example, in a real-time application of VoIP, which has constraints of a shortest delay, a minimum loss rate, and an expedite forwarding may be given a factor of 10, while a backup service with an assured forwarding may be given a factor of 1. These are two extreme classes of path characteristics and the path characteristics may thus have preferred weights that fall in between these two values.

The path entropy generator module 208 is configured to derive a path entropy for each of multiple candidate paths through the network between the source device and the destination device based on the identified PHBs of the nodes for each of a plurality of classes. The path entropy generator module 208 is also configured to identify a ratio of the used path entropy and the maximum path entropy for each of the classes, and then determine if the ratio exceeds a preset threshold value. The path entropy generator module 208 is further configured to start an optimization process to optimize the path through the network from the source device to the destination device based on one or more constraints of the network, such as a bandwidth or latency, in response to the ratio exceeding the preset threshold value. For example, the optimization process may be initiated when the used path entropy becomes a pre-determined percentage (%) of the maximum path entropy.

According to an embodiment, the path entropy for each of the multiple candidate paths is derived by measuring a cumulative PHB of the different classes for each of the multiple candidate paths. Candidate paths having higher path entropies are preferred over candidate paths having lower path entropies.

The optimization module 210 is configured to construct a trunk optimization table based on the maximum path entropies, the used path entropies, and the ratio of the used path entropies and the maximum path entropies. In addition, the optimization module 210 is configured to construct the trunk optimization table for the various classes of services and to also include administratively defined flow control characteristics of class of service/application. Thus, the trunk optimization table may include a column that lists the classes, a column that lists the maximum path entropies, a column that lists the used path entropies, and a column that lists the flow control characteristics. In addition, the paths may be arranged in the trunk optimization table by the entropy order of the paths for each of the classes.

In generating the trunk optimization table, the optimization module 210 is configured to identify all of the possible paths between two points, for instance, from topology details available from the NMS. In addition, the optimization module 210 is configured to evaluate the maximum and the used entropies for each of the paths for each of the classes, which have been determined by the path entropy generator module 208. Moreover, the optimization module 210 is configured to generate the trunk optimization table to categorize each of the paths with increasing entropy order in the N classes. According to a particular example, the N classes may be equal to eight classes. In addition, the optimization module 210 may prioritize each of the plurality of candidate paths in increasing order of the ratio of the used path entropy and the maximum path entropy for a class.

The optimization module 210 is further configured to update the trunk optimization table based on the constraints on the network. In addition, the optimization module 210 is configured to identify suitable candidate paths from the trunk optimization table based on the ratio of the used path entropy and the maximum path entropy for the different classes. For example, when the ratio of the used path entropy and the maximum path entropy for a path and class is below the preset threshold, the path may be determined as a suitable candidate path for the class.

The path selection module 212 is configured to select one of the candidate paths to communicate data of a particular class from the source device to the destination device, based on the entropies of the candidate paths. The path selection module 212 is also configured to map different data flows on the selected different candidate paths based on the entropies of the candidate paths. In another embodiment, the path selection module 212 is configured to find one or more paths that satisfy the constraints of the network from the trunk optimization table, and to assign different data flows for the one or more paths. The path selection module 212 is further configured to select a candidate path for a class among the multiple candidate paths using a resource reservation protocol-traffic engineering (RSVP-TE), which provides connection oriented predicted service over packet network.

According to an example, the path selection module 212 stores the selected candidate paths in the data store 220. According to another example, the path selection module 212 employs the output module 214 to output the selected candidate paths to a computing device, a display screen, etc. As such, in a particular example, the path selection module 212 outputs the selected paths to the nodes on a network to cause the data to be communicated through the selected paths.

An example of a method in which the optimizer 202 may be employed to select a path through a network of nodes from a source device to a destination device for a data flow will now be described with respect to the following flow diagram of the methods 300 and 330 depicted in FIGS. 3A and 3B. It should be apparent to those of ordinary skill in the art that the methods 300 and 330 represent generalized illustrations and that other steps may be added or existing steps may be removed, modified or rearranged without departing from the scopes of the methods 300 and 330.

The descriptions of the methods 300 and 330 are made with reference to the optimizer 202 illustrated in FIG. 2, and thus makes reference to the elements cited therein. It should, however, be understood that the methods 300 and 330 are not limited to the elements set forth in the optimizer 202. Instead, it should be understood that the methods 300 and 330 may be practiced by a system having a different configuration than that set forth in the optimizer 202.

A controller, such as a processor (not shown), may implement or execute the optimizer 202 to perform one or more of the steps described in the methods 300 and 330 in selecting a path through a network of nodes from a source device to a destination device.

Figure 3A:
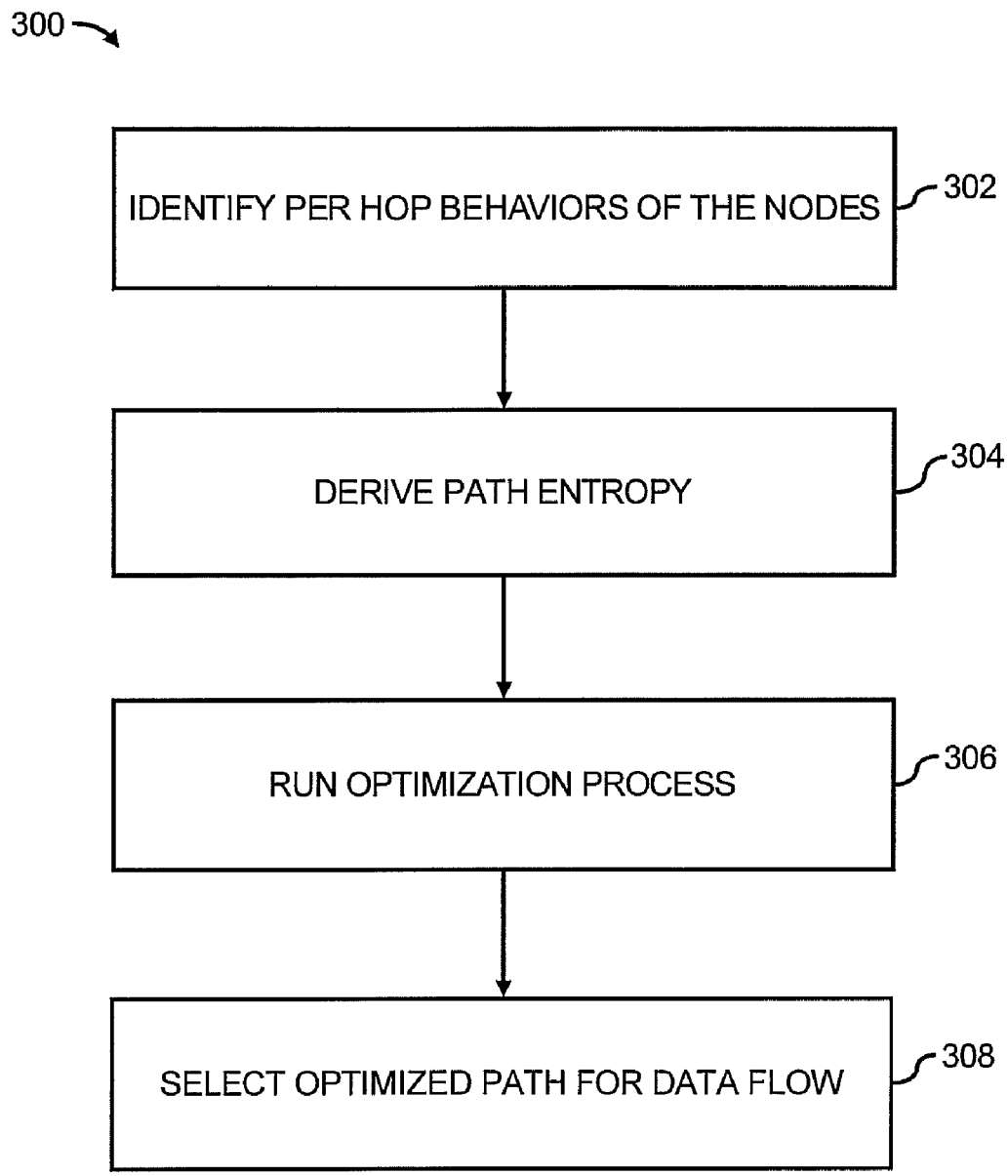
FIG. 3A illustrates a flowchart of a method for selecting a path through a network, according to an embodiment of the present invention.

With reference first to FIG. 3A, there is shown a flowchart of a method 300 for selecting a path through a network, according to an example. At step 302, per hop behaviors (PHBs) of the nodes are identified. According to an example, and as discussed above, PHBs of the nodes for different classes of services may be identified at step 302.

At step 304, a path entropy for each of a plurality of candidate paths through the network between the source device and the destination device are derived based on the identified PHBs. In addition, a maximum path entropy and a used path entropy for each of the plurality of candidate paths may be identified. Moreover, a ratio of the used path entropy and the maximum path entropy may further be identified.

At step 306, an optimization process to identify an optimized path through the network between the source device 102 and the destination device 104 may be run. According to an example, the optimization process may be initiated in response to the ratio of the used path entropy and the maximum path entropy exceeding the preset threshold. Otherwise, the current path may be used to communicate data from the source device 102 to the destination device 104 since there may not be a significant benefit in changing the path.

At step 308, one of candidate paths to communicate data from the source device 102 to the destination device 104 is selected based upon the entropies of the candidate paths. Thus, for instance, the path having the highest entropy may be selected for communication of the data. In another example, the selection of the path may be based upon the class of service to be provided by the nodes. In this example, the path for a particular class having the highest entropy may be selected for communication of the data.

Figure 3B:
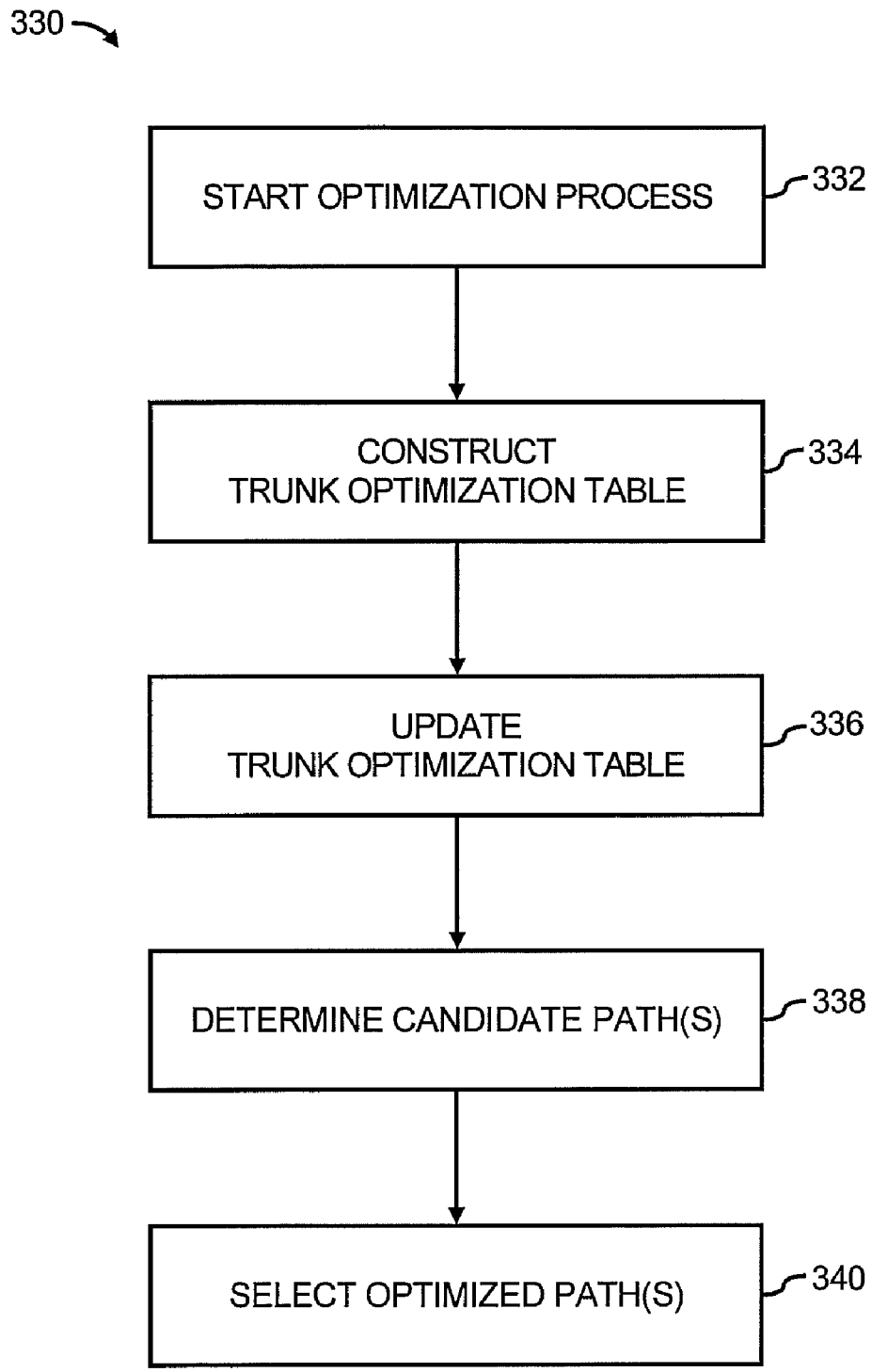
FIG. 3B illustrates a flowchart of a method for performing an optimization process to select one or more paths through a network, according to an embodiment of the present invention.

With particular reference to FIG. 3B, there is shown a flow diagram of a method 330 for performing an optimization process to select one or more paths to communicate data from the source device to the destination device based on the entropies and the classes of the candidate paths through a network, according to an example. Generally speaking, the steps outlined in the method 330 are a more detailed discussion of step 306 in FIG. 3A.

As shown therein, at step 332, an optimization process to optimize the path based on one or more constraints of the network is started. As discussed above, the optimization process may start in response to the ratio of the used path entropy and the maximum path entropy exceeding the preset threshold for one or more of the candidate paths.

At step 334, a trunk optimization table is constructed to include classes of services, maximum path entropies, used path entropies, and preferences associated with each of the possible paths between the source device 102 and the destination device 104.

At step 336, the trunk optimization table is updated based on the one or more constraints of the network. The trunk optimization table may be updated to update the constraints of the network in the trunk optimization table. According to an example, a traffic demand may be updated and mapped on available network resources. According to another example, after the trunk optimization table is constructed at step 334, a class of service, such as a VoIP service may need to have more bandwidth as the threshold of its usage has been exceeded. Thus, more bandwidth to the VoIP service may be reserved and instead, a lower class of service, such as a backup service may be unreserved. This is controlled by the flow control attribute of path preference in the trunk optimization table.

At step 338, candidate paths are arranged in the trunk optimization table based upon the entropies of the paths. According to a particular example, the candidate paths are arranged according to the entropies of each of the classes. Thus, for instance, for each of the classes, the paths having the highest entropies may be listed higher in the trunk optimization table as compared with paths having the lower entropies.

At step 340, for one or more classes, one of the candidate paths among the multiple candidate paths is selected based on the entropies of the candidate paths. The candidate path through which data is communicated from the source device to the destination device may also be selected based on a resource reservation protocol-traffic engineering (RSVP-TE), which provides connection oriented predicted service over packet network.

Some or all of the operations set forth in the methods 300 and 330 may be contained as a utility, program, or subprogram, in any desired computer accessible medium. In addition, the methods 300 and 330 may be embodied by computer programs, which can exist in a variety of forms both active and inactive. For example, they may exist as software program(s) comprised of program instructions in source code, object code, executable code or other formats. Any of the above may be embodied on a computer readable medium, which include storage devices.

Exemplary computer readable storage devices include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 4:
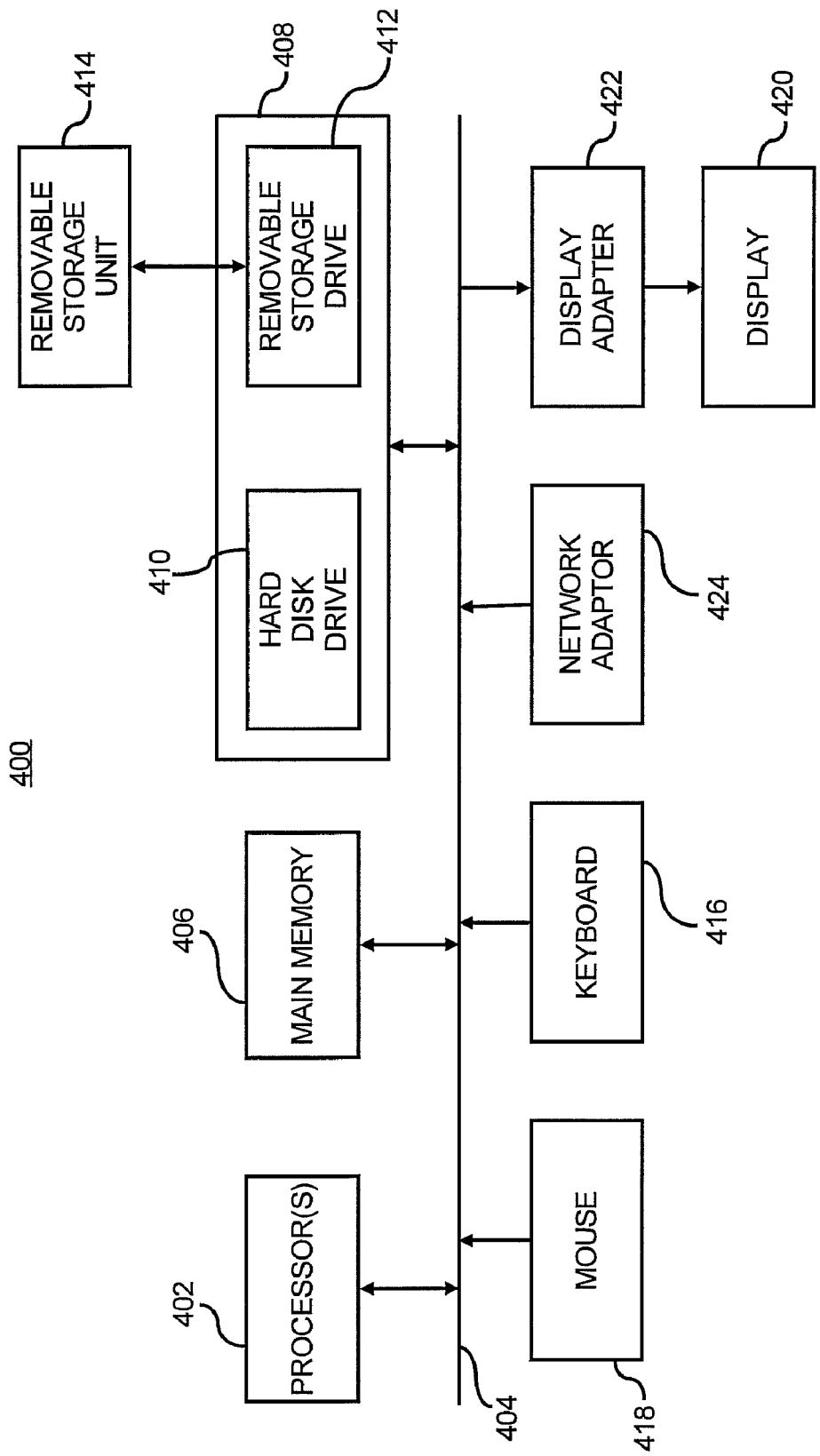
FIG. 4 shows a block diagram of a computer system that may be used as a platform for an optimizer shown in FIG. 2, according to an embodiment of the present invention.

FIG. 4 illustrates a block diagram of a computing apparatus 400 configured to implement or execute the optimizer 202 depicted in FIG. 2, according to an example. In this respect, the computing apparatus 400 may be used as a platform for executing one or more of the functions described hereinabove with respect to the optimizer 202.

The computing apparatus 400 includes a processor 402 that may implement or execute some or all of the steps described in the methods 300 and 330. Commands and data from the processor 402 are communicated over a communication bus 404. The computing apparatus 400 also includes a main memory 406, such as a random access memory (RAM), where the program code for the processor 402, may be executed during runtime, and a secondary memory 408. The secondary memory 408 includes, for example, one or more hard disk drives 410 and/or a removable storage drive 412, representing a floppy diskette drive, a magnetic tape drive, a compact disk drive, etc., where a copy of the program code for the methods 300 and 330 may be stored.

The removable storage drive 410 reads from and/or writes to a removable storage unit 414 in a well-known manner. User input and output devices may include a keyboard 416, a mouse 418, and a display 420. A display adaptor 422 may interface with the communication bus 404 and the display 420 and may receive display data from the processor 402 and convert the display data into display commands for the display 420. In addition, the processor(s) 402 may communicate over a network, for instance, the Internet, LAN, etc., through a network adaptor 424.

It will be apparent to one of ordinary skill in the art that other known electronic components may be added or substituted in the computing apparatus 400. It should also be apparent that one or more of the components depicted in FIG. 4 may be optional (for instance, user input devices, secondary memory, etc.).

What have been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. A method for selecting a path through a network of nodes from a source device to a destination device, said method comprising:
    identifying, by a processor, per hop behaviors (PHBs) of a plurality of candidate paths through the network of nodes from the source device to the destination device;
    deriving, by the processor, a path entropy for each of the plurality of candidate paths through the network of nodes between the source device and the destination device based upon the PHBs of the plurality of candidate paths; and
    selecting, by the processor, one of the plurality of candidate paths to communicate data from the source device to the destination device based on the path entropies of the plurality of candidate paths.

2. The method according to claim 1, wherein identifying the PHBs of the nodes further comprises:
    identifying the PHBs of the plurality of candidate paths for a plurality of classes, wherein each of the plurality of classes is a different class of service/application associated with a data flow.

3. The method according to claim 2, wherein each of the plurality of candidate paths is associated with a maximum path entropy and a used path entropy, wherein the maximum path entropy is the highest path entropy attainable by a particular candidate path for each of the plurality of classes and the used path entropy is a currently used path entropy of the particular path for each of the plurality of classes.

4. The method according to claim 3, wherein deriving the path entropy for each of the plurality of candidate paths further comprises:
    for each of the plurality of candidate paths,
        identifying a ratio of the used path entropy and the maximum path entropy;
        determining whether the identified ratio exceeds a preset threshold; and
        starting an optimization process to optimize the path through the network of nodes from the source device to the destination device in response to the identified ratio exceeding the preset threshold.

5. The method according to claim 4, wherein starting an optimization process further comprises:
    constructing a trunk optimization table listing the maximum path entropy, the used path entropy, and one or more flow control preferences for each of the plurality of candidate paths of the plurality of classes.

6. The method according to claim 5, wherein constructing a trunk optimization table further comprises:
    updating the trunk optimization table based on one or more constraints of the network;
    determining the plurality of candidate paths based on the updated trunk optimization table; and
    selecting one of the plurality of candidate paths among the plurality of candidate paths based on a resource reservation protocol-traffic engineering (RSVP-TE), wherein the RSVP-TE provides a connection oriented predicted service over the network.

7. The method according to claim 5, further comprising:
    determining the plurality of candidate paths from the trunk optimization table; and
    prioritizing each of the plurality of candidate paths in the trunk optimization table based on the identified ratio.

8. The method according to claim 5, further comprising:
    selecting one of the plurality of candidate paths for each of the plurality of classes from the trunk optimization table; and
    mapping each of a plurality of data flows on the selected one of the plurality of candidate paths.

9. The method according to claim 5, further comprising:
    identifying one or more paths from the trunk optimization table that satisfy one or more constraints of the network; and
    assigning a plurality of data flows for the one or more identified paths.

10. The method according to claim 2, wherein deriving the path entropy for each of the plurality of candidate paths further comprises:
    deriving the path entropy for each of the plurality of candidate paths, wherein the path entropy for each of the plurality of candidate paths is derived by measuring a cumulative PHB of the plurality of classes for each of the plurality of candidate paths, and wherein candidate paths having higher path entropies are preferred over candidate paths having lower path entropies.

11. The method according to claim 2, wherein the PHBs of the plurality of candidate paths for the plurality of classes is defined as:
    PHB $(c_i) = B * C_i * W_i$, wherein PHB $(c_i)$ is the PHB of the ith class of service/application, B is a maximum percent (%) reserved link bandwidth for the ith class of service/application, $C_i$ is a cost of the path for the ith class of service/application to utilize the path, and $W_i$ is an administrative controlled preferred weight for the ith class of service/application, the administrative controlled preferred weight is a predefined path preference for the ith class of service/application.

12. A computer-implemented optimizer for selecting a path through a network of nodes from a source device to a destination device, said computer-implemented optimizer comprising:
    a memory on which is stored machine readable instructions comprising code to:
        identify PHBs of a plurality of candidate paths through the network of nodes from the source device to the destination device;
        derive a path entropy for each of the plurality of candidate paths through the network of nodes between the source device and the destination device based upon the PHBs of the plurality of candidate paths; and
        select one of the plurality of candidate paths to communicate data from the source device to the destination device based on the derived path entropies of the plurality of candidate paths; and
    a processor to implement the machine readable instructions.

13. The computer-implemented optimizer according to claim 12, wherein the machine readable instructions further comprise code to identify the PHBs of the plurality of candidate paths for a plurality of classes, wherein each of the plurality of classes is a different class of service/application associated with a data flow, and wherein each of the plurality of candidate paths is associated with a maximum path entropy and a used path entropy, wherein the maximum path entropy is the highest path entropy attainable by a particular candidate path for each of the plurality of classes and the used path entropy is a currently used path entropy of the particular path for each of the plurality of classes.

14. The computer-implemented optimizer according to claim 13, wherein the machine readable instructions further comprise code to, for each of the plurality of candidate paths, identify a ratio of the used path entropy and the maximum path entropy, to determine if the identified ratio exceeds a preset threshold, and to start an optimization process to optimize the path through the network of nodes from the source device to the destination device based on one or more constraints of the network in response to the identified ratio exceeding the preset threshold.

15. The computer-implemented optimizer according to claim 13, wherein the machine readable instructions further comprise code to construct a trunk optimization table listing the maximum path entropy, the used path entropy, and one or more flow control preferences for each of the plurality of candidate paths of the plurality of classes, to update the trunk optimization table based on one or more constraints of the network, to determine the plurality of candidate paths based on the updated trunk optimization table, and to select one of the plurality of candidate paths among the plurality of candidate paths based on a resource reservation protocol-traffic engineering (RSVP-TE), wherein the RSVP-TE provides a connection oriented predicted service over the network.

16. The computer-implemented optimizer according to claim 13, wherein the PHB of the plurality of candidate paths for the plurality of classes is defined as:

PHB (ci)=B*Ci*Wi, wherein PHB (ci) is the PHB of the ith class of service, B is a maximum percent (%) reserved link bandwidth for the ith class of service, Ci is a cost of the path for the ith class of service to utilize the path, and Wi is an administrative controlled preferred weight for the ith class of service, the administrative controlled preferred weight is a predefined path preference for the ith class of service.

17. A non-transitory computer readable storage medium on which is embedded a set of machine readable instructions that when executed by a processor implements a method of selecting a path through a network of nodes from a source device to a destination device, said set of machine readable instructions comprising code to:

identify per hop behaviors (PHBs) of a plurality of candidate paths through the network of nodes from the source device to the destination device for a plurality of classes, wherein each of the plurality of classes is a class of service for differentiating a plurality of data flows;

derive a path entropy for each of the plurality of classes for each of the plurality of candidate paths through the network of nodes between the source device and the destination device based upon the PHBs of the plurality of candidate paths, wherein the path entropy for each of the plurality of candidate paths is derived by measuring a cumulative PHB of the plurality of classes for each of the plurality of candidate paths, and wherein each of the plurality of candidate paths is associated with a maximum path entropy and a used path entropy, wherein the maximum path entropy is the highest path entropy attainable by a particular candidate path for each of the plurality of classes and the used path entropy is a currently used path entropy of the particular path; and select one of the plurality of candidate paths to communicate data from the source device to the destination device based on the path entropies of the plurality of candidate paths.

18. The non-transitory computer readable storage medium according to claim 17, wherein the set of machine-readable instructions further comprises code to, for each of the plurality of candidate paths:

identify a ratio of the used path entropy and the maximum path entropy;

determine whether the identified ratio exceeds a preset threshold; and start an optimization process to optimize the path through the network of nodes from the source device to the destination device based on one or more constraints of the network in response to the identified ratio exceeding the preset threshold.

19. The non-transitory computer readable storage medium according to claim 18, wherein the set of machine-readable instructions further comprises code to:

construct a trunk optimization table listing the maximum path entropy, the used path entropy, and one or more flow control preferences for each of a plurality of candidate paths of the plurality of classes;

determine the plurality of candidate paths from the trunk optimization table;

prioritize each of the plurality of candidate paths in the trunk optimization table based on the identified ratio;

update the trunk optimization table based on the one or more constraints of the network;

determine the plurality of candidate paths based on the updated trunk optimization table; and select one of the plurality of candidate paths among the plurality of candidate paths based on a resource reservation protocol-traffic engineering (RSVP-TE), wherein the RSVP-TE provides a connection oriented predicted service over the network.

20. The non-transitory computer readable storage medium according to claim 17, wherein the PHB of the plurality of candidate paths for the plurality of classes is defined as:

PHB (ci)=B*Ci*Wi, wherein PHB (ci) is the PHB of the ith class of service, B is a maximum percent (%) reserved link bandwidth for the ith class of service, Ci is a cost of the path for the ith class of service to utilize the path, and Wi is an administrative controlled preferred weight for the ith class of service, the administrative controlled preferred weight is a predefined path preference for the ith class of service.

* * * * *